United States Patent [19]

McKenry

[11] 4,214,617
[45] Jul. 29, 1980

[54] STUMP CUTTER
[75] Inventor: Robert J. McKenry, Windber, Pa.
[73] Assignee: Kennametal Inc., Latrobe, Pa.
[21] Appl. No.: 916,154
[22] Filed: Jun. 19, 1978
[51] Int. Cl.$^2$ .................. B27C 3/00; A01G 23/06
[52] U.S. Cl. ................... 144/2 N; 175/385; 175/388; 408/201; 408/225
[58] Field of Search ............ 144/2 N; 175/385, 335, 175/388, 394; 241/294; 408/201, 213, 225, 199; 145/116 R, 121

[56] References Cited
U.S. PATENT DOCUMENTS

| | | | |
|---|---|---|---|
| 966,377 | 8/1910 | Barker | 175/385 |
| 1,164,659 | 12/1915 | Moore | 144/2 N |
| 1,534,856 | 4/1925 | McKoy et al. | 144/2 N |
| 1,534,858 | 4/1925 | McKoy | 144/2 N |
| 2,029,447 | 2/1936 | Swain | 145/116 R |
| 2,804,895 | 9/1957 | Clement | 408/225 |
| 2,883,888 | 4/1959 | Stewart | 145/116 R |
| 3,375,890 | 4/1968 | Petersen | 175/385 |
| 4,116,578 | 9/1978 | Gelfand et al. | 408/225 |
| 4,127,355 | 11/1978 | Oakes | 408/225 |

FOREIGN PATENT DOCUMENTS 1091803 10/1960 Fed. Rep. of Germany .......... 175/385
267755 7/1950 Switzerland ........................ 144/2 N Primary Examiner—W. Donald Bray
Attorney, Agent, or Firm—Lawrence R. Burns

[57] ABSTRACT

A stump cutter is disclosed having a rotatable shank upon which a transverse support bar is attached. Tool holders are mounted in a distributed relation on the support bar and replaceable cutter bits are mounted in the tool holders. Mounted on the forward end of either the shank or support bar is a pilot member that holds the stump cutter engaged to the stump during cutting operations.

9 Claims, 2 Drawing Figures

STUMP CUTTER

BACKGROUND OF THE INVENTION

This invention relates to stump cutters or root cutters for the clearing of fields. The drilling or disintegration of wood fiber is somewhat different from the drilling or augering of earth formations and takes specially designed tools for best results.

Boring and augering tools are known, as exemplified by applicant's own U.S. Pat. No. 3,720,273. Specialized forms of related tools are also known for stump cutting, as is exemplified by applicant's U.S. Pat. No. 3,570,566.

These tools are, of course, mentioned by way of example, and the listing is not intended to be exhaustive. While the stump cutting tool described in U.S. Pat. No. 3,570,566 has been somewhat successful, means are required for rotating the disc in a vertical plane.

An object of the present invention is the provision of a tool for cutting stumps having a disc that can be driven in rotation in a substantially horizontal plane.

Another object of the present invention is the provision of an improved type stump cutting tool that will find universal application on already existing equipment.

Another object of the present invention is the provision of a stump cutting tool having means thereon for advancing itself during cutting operations.

BRIEF SUMMARY OF THE INVENTION

According to the present invention, a stump cutter is constructed comprising a shank means which is rotatable about its longitudinal axis. One end is adapted to be driven in rotation and a support bar is transversely attached facing toward the other end. Preferably, the support bar forms a 90 degree angle with the shank.

Distributed along the support bar are tool holders facing the other end and spaced radially outwardly from the shank. The tool holders are adapted for receiving the replaceable cutter bits, preferably nonrotatable cutter bits.

A pilot member extends forwardly and is attached to the shank or the central part of the support bar. The pilot member is preferably threaded so that the rotation of the stump cutter causes the threads to advance in the stump and pull the cutter further into the material being cut. A cork screw spiral type thread formed on the pilot member has been found to be satisfactory.

Preferably, the pilot member is substantially concentric and parallel with the longitudinal axis of the shank. Although the cutter bits may be the point attack type tool bits known within the industry which rotate in their holders, preferably, the cutter bits are the nonrotatable, flat type cutter bits having flat surfaces facing in the direction of rotation.

When the tool holders and bits are arranged on the tool holder, preferably, the bits are non-tracking, that is, the path of one cutter bit preferably overlaps the cutting path of another cutting bit in such a manner that no two of said cutter bits cuts exactly in the same path.

Also, the tool holders and bits are preferably distributed so that the cutter bit, at the outermost diameter on the support bar, is nearest to the leading edge of the support bar. The cutter bits are placed progressively farther back from the leading edge of the support bar as they are placed closer to the central diameter of the shank means.

The exact nature of the present invention will become more clearly apparent upon reference to the following detailed specification taken in connection with the accompanying drawings in which:

DETAILED DESCRIPTION OF THE INVENTION

Figure 1:
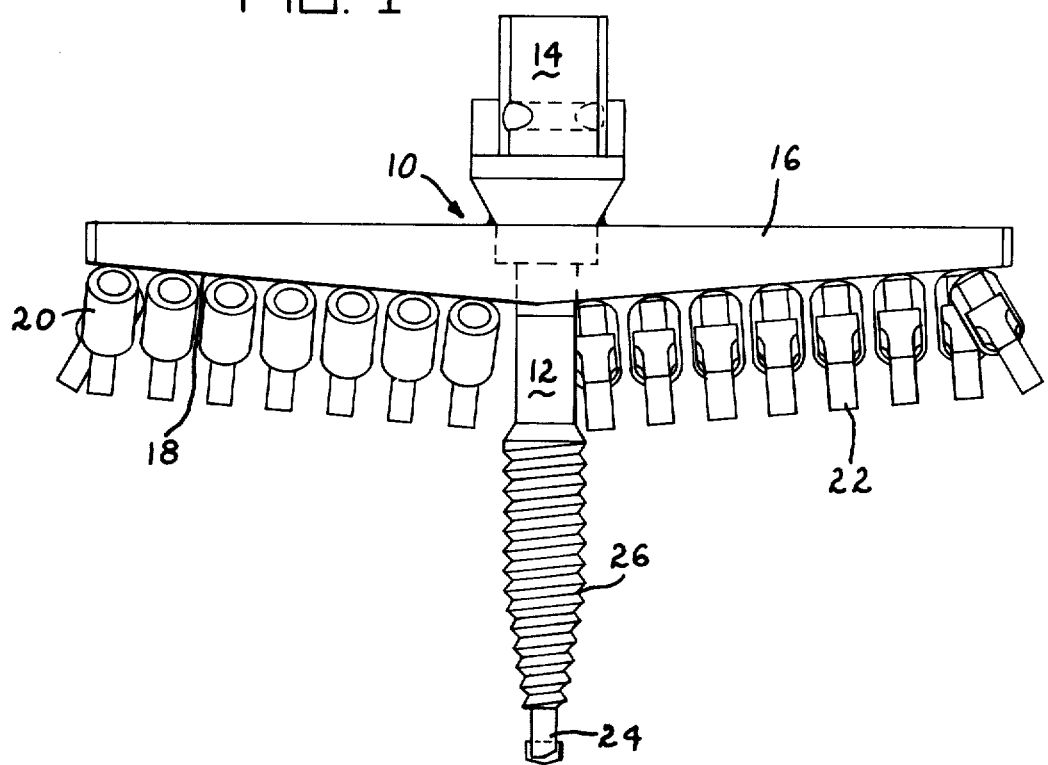
FIG. 1 is a side view of a stump cutter according to the present invention.

Referring to the drawings somewhat more in detail, what is shown in FIG. 1 is a stump cutter 10 having a shank 12 with one end of the shank 14 adapted to be driven in rotation. Attached to the shank 12 is a transverse support bar 16 which preferably forms a 90 degree angle with the longitudinal axis of the shank 12. A support bar provides a surface 18 which faces away from the end and is driven in rotation and provides a space for tool holders 20 to be attached to support bar 16.

Tool holders 20 are distributed radially along support bar 16 and are adapted to receive cutter bits 22. Cutter bits 22 are replaceably mounted in the tool holders and may be either the rotating or nonrotating type bits known within the industry. Preferably, they are flat type cutter bits that are nonrotatable and have a flat surface facing in the direction of rotation.

Mounted on the shank 12 and/or support bar 16 is a forwardly extending pilot member 24 having threads 26 thereon. The pilot member 24 is preferably threaded so that, as the cutting member rotates, the pilot member will pull the cutters into the work.

Figure 2:
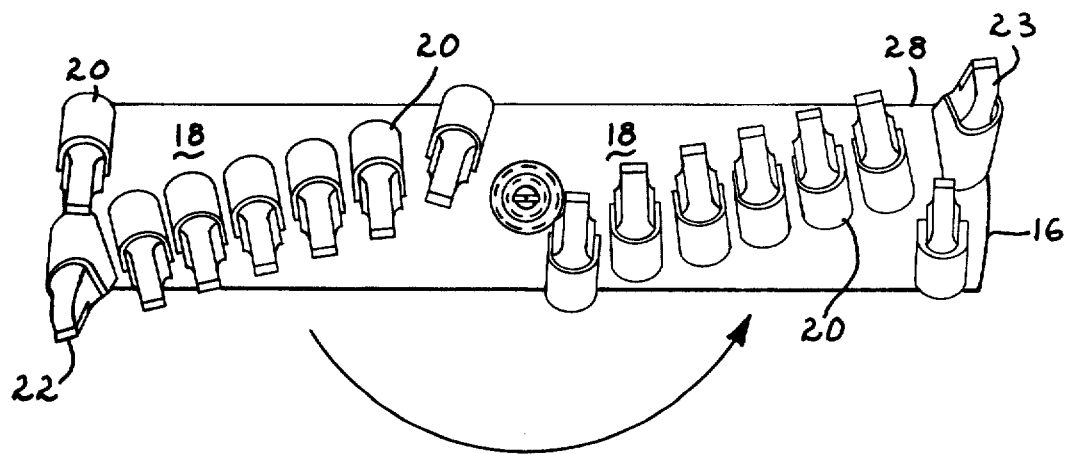
FIG. 2 is a top view of a stump cutter according to the present invention.

Shown in FIG. 2 is a top view of the stump cutter showing a surface 18 having the tool holders 20 distributed radially from the center line of shank 14. Tool holders 20 are shown having cutter bits 22 mounted therein. Both the tool holders and the cutter bits are distributed so that the outermost cutter 23 is located near the leading edge 28.

Each of the cutter bits and tool holders is spaced farther back from the leading edge 28 as the tool holders are distributed inwardly toward the shank center line.

Modifications may be made within the scope of the appended claims.

I claim:

1. A stump cutter comprising: shank means rotatable about its longitudinal axis and adapted on one end to be driven in rotation; support means edge transversely attached to said shank means and having a leading edge in the direction or rotation; tool holders mounted on said support means and distributed on said support means radially outwardly from said shank means so that the cutting path of one cutter bit overlaps the cutting path of another cutter bit, said tool holders being located nearest the leading edge of the support means at the outermost radius from said shank means and progressing farther back from the leading edge as the locating radius from said shank means decreases, said tool holders adapted for receiving replaceable cutter bits; and a pilot member extending forwardly from one of said means for engagement with a stump, and means on said pilot member that urges the stump cutter into engagement with the stump when said shank is rotated.

2. A stump cutter according to claim 1 wherein said pilot member is substantially concentric and parallel with the longitudinal axis of said shank.

3. A stump cutter according to claim 1 in which replaceable cutter bits are mounted in said tool holder.

4. A stump cutter according to claim 3 in which said cutter bits comprise flat type cutter bits having flat surfaces facing the direction of rotation.

5. A stump cutter according to claim 4 in which said tool holders and cutter bits are mounted and arranged so that the cut path of one cutter bit overlaps the cut path of another cutter bit.

6. A stump cutter according to claim 5 in which said tool holders are arranged so that no two of said cutter bits cut exactly the same cutter path.

7. A stump cutter according to claim 1 in which said means on said pilot member are threads that advance the cutter bits into the stump as the shank is rotated.

8. A stump cutter according to claim 7 in which said pilot member comprises a cork screw spiral.

9. A stump cutter according to claim 4 in which said cutter bits on said transverse support means are distributed near the leading edge at the outermost diameter and progressively farther back from the leading edge as the diameter decreases.

* * * * *